United States Patent
Apostin et al.

(10) Patent No.: US 12,503,248 B2
(45) Date of Patent: Dec. 23, 2025

(54) TURBOPROP CAPABLE OF PROVIDING A RAM AIR TURBINE FUNCTION AND AIRCRAFT COMPRISING SUCH A TURBOPROP

(71) Applicant: SAFRAN HELICOPTER ENGINES, Bordes (FR)

(72) Inventors: Lucie Stéphanie Apostin, Moissy Cramayel (FR); Didier Claude Chartrain, Moissy Cramayel (FR); Jean-Michel Presse, Moissy Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/293,659

(22) PCT Filed: Aug. 2, 2022

(86) PCT No.: PCT/FR2022/051548
§ 371 (c)(1),
(2) Date: Jan. 30, 2024

(87) PCT Pub. No.: WO2023/012435
PCT Pub. Date: Feb. 9, 2023

(65) Prior Publication Data
US 2024/0336367 A1 Oct. 10, 2024

(30) Foreign Application Priority Data
Aug. 4, 2021 (FR) ...................... 21 08484

(51) Int. Cl.
*B64D 35/021* (2024.01)
*B64D 27/30* (2024.01)
(Continued)

(52) U.S. Cl.
CPC .......... *B64D 35/021* (2024.01); *B64D 27/30* (2024.01); *B64D 31/06* (2013.01); *F01D 7/00* (2013.01);
(Continued)

(58) Field of Classification Search
CPC ....... F01D 15/10; F01D 25/20; B64D 35/021; B64D 27/30; B64D 41/00; F05D 2220/34; F05D 2220/76
See application file for complete search history.

(56) References Cited

U.S. PATENT DOCUMENTS 7,172,391 B2  2/2007 Carvalho
7,621,117 B2 * 11/2009 Dooley ................. F01D 19/00
                                                      60/793

(Continued)

FOREIGN PATENT DOCUMENTS

EP  1 031 717 A2  8/2000
EP  1 031 717 A3  8/2000

(Continued)

OTHER PUBLICATIONS

International Search Report & Written Opinion issued Nov. 28, 2022 in PCT/FR2022/051548, filed on Aug. 2, 2022, 15 pages (with English Translation).

(Continued)

*Primary Examiner* — Topaz L. Elliott
(74) *Attorney, Agent, or Firm* — Oblon, McClelland, Maier & Neustadt, L.L.P.

(57) ABSTRACT

A turboprop includes a propeller, a propeller shaft carrying the propeller, the propeller being a variable-pitch propeller having a propeller pitch, a rotating electric machine having at least a first configuration in which it is mechanically coupled to the propeller shaft and at least one oil pump configured to supply a hydraulic circuit for adjusting the (Continued)

pitch of the propeller. The oil pump is configured to be electrically operated. An aircraft can include such a turboprop and methods can control such a turboprop and such an aircraft.

10 Claims, 6 Drawing Sheets

(51) Int. Cl.
    *B64D 31/06*     (2024.01)
    *F01D 7/00*     (2006.01)
    *F01D 15/10*     (2006.01)
    *F01D 25/20*     (2006.01)

(52) U.S. Cl.
    CPC .............. *F01D 15/10* (2013.01); *F01D 25/20* (2013.01); *F05D 2220/34* (2013.01)

(56) References Cited

U.S. PATENT DOCUMENTS

| | | | |
|---|---|---|---|
| 7,849,668 B2 * | 12/2010 | Sheridan | F01D 25/20 384/473 |
| 9,973,058 B2 | 5/2018 | Perkinson | |
| 10,371,007 B2 * | 8/2019 | Cigal | F01D 25/20 |
| 11,097,849 B2 * | 8/2021 | Pastouchenko | F02K 1/18 |
| 11,396,821 B2 * | 7/2022 | Tajan | B64C 11/38 |
| 2006/0108807 A1 * | 5/2006 | Bouiller | F02C 7/268 290/52 |
| 2007/0289310 A1 * | 12/2007 | Dooley | F01D 15/10 60/773 |
| 2014/0161591 A1 * | 6/2014 | Venter | F16H 57/043 184/6.12 |
| 2015/0060206 A1 * | 3/2015 | Laigle | F01D 25/20 184/6.2 |
| 2016/0258324 A1 * | 9/2016 | Cigal | F01D 21/00 |
| 2018/0050810 A1 * | 2/2018 | Niergarth | B64C 11/001 |
| 2019/0264617 A1 * | 8/2019 | Barmichev | F01D 7/00 |
| 2019/0292944 A1 * | 9/2019 | Mason | F01M 1/02 |
| 2020/0079513 A1 * | 3/2020 | Pastouchenko | F02C 6/14 |
| 2021/0381388 A1 * | 12/2021 | Tajan | F01D 25/16 |
| 2021/0388733 A1 * | 12/2021 | Valois | F01D 15/10 |
| 2022/0397060 A1 * | 12/2022 | Winter | F02K 5/00 |
| 2023/0417180 A1 * | 12/2023 | Klonowski | F02C 6/206 |
| 2024/0417078 A1 * | 12/2024 | Durocher | B64D 27/30 |

FOREIGN PATENT DOCUMENTS

GB           684490 A     12/1952
WO    WO-2020074817 A1 *   4/2020    .......... F04D 29/323

OTHER PUBLICATIONS

French Preliminary Search Report & Written opinion issued Apr. 5, 2022 in FR application 21 08484, filed on Aug. 4, 2021, 10 pages (with English Translation of Categories of Cited Documents).

* cited by examiner

TURBOPROP CAPABLE OF PROVIDING A RAM AIR TURBINE FUNCTION AND AIRCRAFT COMPRISING SUCH A TURBOPROP

TECHNICAL FIELD

The invention relates to the field of turbomachinery and more specifically to that of turboprops.

The object of the invention is more specifically a turboprop, an aircraft having such a turboprop and methods for controlling such turboprops and aircraft.

PRIOR ART

In the event of an in-flight engine failure, the use of a ram air turbine is known for providing the aircraft with an emergency source of power and thus ensuring the continuing operation of the essential on-board systems as well as the critical flight controls and flight instruments.

Such a ram air turbine comprises an independent propeller, a dedicated electric generator and an actuator system that enables the turbine to be deployed if needed. Therefore, the ram air turbine has a significant onboard mass, despite the fact that during normal operation of the aircraft, it is not used at all.

Therefore, it would be a good idea to do away with such a ram air turbine when it would be possible to provide energy via an alternative source in the event of engine failure.

DESCRIPTION OF THE INVENTION

The invention thus aims to solve the aforementioned issue and the object of the invention is thus to provide an alternative energy source to a ram air turbine that has a lower onboard mass compared to a ram air turbine.

To achieve this, the invention relates to a turboprop comprising:
- a propeller,
- a propeller shaft carrying the propeller, the propeller being a variable-pitch propeller having a propeller pitch,
- a rotating electric machine having at least a first configuration in which it is mechanically coupled to the propeller shaft, and
- at least one oil pump designed to supply a hydraulic circuit for adjusting the pitch of the propeller, the oil pump being designed to be electrically operated.

Such an oil pump, by being designed to be electrically operated and unlike the oil pumps in the prior art, makes it possible to supply the hydraulic circuit for adjusting the pitch of the propeller, while the turboprop does not contribute to propulsion. It is thus possible to adjust the pitch of the propeller in order to rotationally drive the propeller by windmill effect and therefore rotate the propeller shaft and the rotating electric machine that is mechanically coupled thereto. Such a rotation of the rotating electric machine makes it possible to provide an emergency energy source in the event that the turboprops of the aircraft fail without it being necessary to fit the aircraft with additional safety equipment. It is thus possible to limit the onboard mass of the aircraft.

It should be noted, in addition, that such a turboprop configuration allows precise adjustment of the propeller pitch besides providing a ram air turbine. It is thus possible to adapt the propeller pitch to the speed of the aircraft and to provide sufficient energy production over a relatively wide range of aircraft speeds. The invention also makes it possible to ensure lubrication of the bearings of the gearbox and to recover the oil from the lubrication of the bearings and from the leak at the actuator for pitch change to return it to the main reservoir.

The invention enables the propeller to perform a ram air turbine function thanks to simple modifications of the oil circuit and of the gearbox without modifying the propeller or adding any complex mechanism intended for this function.

The oil pump can be an engine oil pump designed to also be driven by a turbine of the turboprop, the engine oil pump preferably being mechanically coupled to said turbine by means of a freewheel.

In this way, it is possible to use the engine oil pump of the turboprop operated electrically in ram air turbine mode of the turboprop whilst maintaining a conventional configuration of the turboprop when the latter helps to propel the aircraft.

It should be noted that in a conventional configuration, the oil pump can be driven by the gas turbine, more specifically by its high-pressure turbine and the high-pressure shaft to which said high-pressure turbine is mechanically coupled.

Engine oil pump is understood above and in the remainder of the invention to mean the pump of the turboprop designed to supply, from an oil reservoir of the turboprop, the various elements of the turboprop that have to be lubricated or supplied with oil pressure including, in particular, the bearings and the hydraulic circuit for adjusting the pitch of the propeller. It should be noted that, in addition to the engine pump, the turboprop can comprise secondary, so-called dedicated, pumps, such as a dedicated pump of a system for managing the propeller pitch or a pump for recovering oil.

The oil pump can be a hybrid engine oil pump designed to be driven either by the turbine, or by an electric engine inside the engine oil pump.

With such a configuration, the design of the engine oil pump does not have to be significantly adapted as it is electrically driven by an external element, the electric motor, as is the case for an engine oil pump of a turboprop in the prior art where it is the turbine that provides the drive.

The oil pump can be an auxiliary electric pump supplying the hydraulic circuit for adjusting a pitch of the propeller in parallel with an engine oil pump of the turboprop rotationally driven by a turbine of the turboprop.

In this way, the invention can easily be adapted to current turboprops by adding the auxiliary electric pump and the corresponding auxiliary oil circuit. The turboprop can also comprise a system for managing the propeller pitch including a dedicated oil pump and a servo valve, the dedicated oil pump and the servo valve being supplied with oil by the oil pump, the system for managing the propeller pitch being arranged between the oil pump and the hydraulic circuit for adjusting the pitch of the propeller, the turboprop also comprising a bypass system which, when the oil pump is electrically operated, is adapted to allow oil to be supplied to the hydraulic circuit for adjusting a pitch of the propeller via the servo valve bypassing the dedicated oil pump of the system for managing the propeller pitch.

Such a bypass system makes it possible to limit the oil pressure required to supply the hydraulic circuit for adjusting the pitch of the propeller and thus makes it possible to optimize the transition of the turboprop to ram air turbine mode.

The invention also relates to an aircraft comprising at least one turboprop according to the invention.

As such an aircraft does not have to comprise a ram air turbine, it can have a smaller onboard mass compared to the aircraft in the prior art, which do have to comprise a ram air turbine.

The invention also relates to a method for controlling a turboprop as a ram air turbine, wherein the turboprop is a turboprop according to the invention, the method comprising the following steps:
- electrically operating the oil pump so as to supply oil to the hydraulic circuit for adjusting a pitch of the propeller,
- adjusting the pitch of the propeller to generate the windmill effect to rotationally drive the propeller,
- the rotating electric machine being rotationally driven by the propeller shaft due to the mechanical coupling between them, generating electricity from the rotating electric machine.

Such a method makes it possible, using a turboprop according to the invention, to put said turboprop in a ram air turbine operating mode and thus to supply the aircraft with electrical power when all of the turboprops of the aircraft have stopped operating as propulsion units.

The invention also relates to a method for controlling an aircraft comprising a plurality of turboprops according to the invention, comprising, when the aircraft is in flight, the following steps:
- the plurality of turboprops having stopped, receiving a request to put at least one turboprop in a ram air turbine type operating mode,
- a turboprop from the plurality of turboprops carrying out a control method according to the invention.

With such a method, it is possible to supply the aircraft with energy from at least one of the turboprops even though the plurality of turboprops has stopped operating.

When a turboprop from the plurality of turboprops carries out a control method according to the invention, the turboprop carrying out the control method according to the invention can be the turboprop among the plurality of turboprops which is the last to stop.

It can also be provided:
- in the event that, when the control method is carried out by the last turboprop to stop, it proves incapable of switching to ram air turbine mode, identifying among the other turboprops from the plurality of turboprops the one with the highest oil temperature,
- the turboprop identified carrying out the control method according to the invention.

In this way, with such possibilities, the turboprop switching to ram air turbine mode is the one with the best oil fluidity conditions for implementing the ram air turbine mode.

BRIEF DESCRIPTION OF THE FIGURES

The present invention will be better understood upon reading the description of exemplary embodiments, provided purely by way of example and in no way limiting, with reference to the appended drawings in which.

Identical, similar or equivalent parts in the various figures bear the same reference numerals so as to make it easier to switch from one figure to another. The various parts shown in the figures are not necessarily shown on a uniform scale in order to make the figures more readable.

The various possibilities (variants and embodiments) should be understood as not being mutually exclusive and can be combined.

Detailed Description of Particular Embodiments

Figure 1:
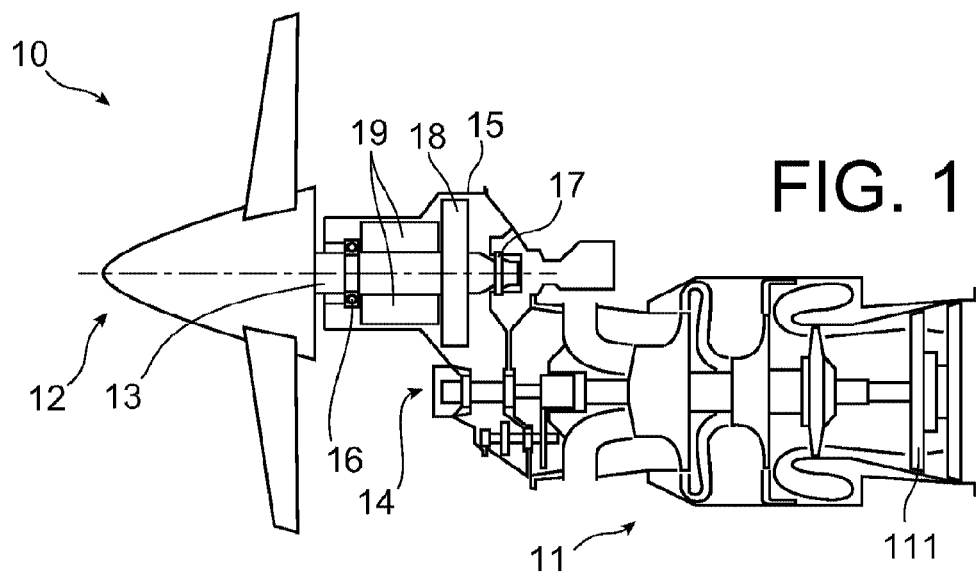
FIG. 1 shows a turboprop according to the invention.

FIG. 1 shows a turboprop 10 according to the invention, which therefore has a ram air turbine type operating mode.

According to this present embodiment, the turboprop 10 is a turboprop with a free turbine. Thus, the turboprop 10 comprises a gas turbine 11 comprising a high-pressure turbine (not referenced), rotationally driving a turbine shaft 14 and a compressor (not referenced), and a free turbine 111 which drives a secondary shaft (not referenced) of the gas turbine, concentric with the turbine shaft 14. The turboprop 10 thus comprises, as shown in FIG. 1, the gas turbine 11, a propeller 12, a propeller shaft 13, extending towards the gas turbine 11 and being coupled, as will be described hereinafter, to the free turbine 111 by means of a transmission. The propeller shaft 13 is surrounded by a protective casing 15. It is supported in the casing 15 by bearings 16 and 17. One of the bearings 16 is close to the propeller 12, and the other bearing 17 is adjacent to a gear wheel 18 for driving the propeller shaft 13, which meshes with the abovementioned transmission. The rotating electric machine 19 is, in this example of the invention, arranged concentrically around the propeller shaft 13, between the first bearing 16 and the gear wheel 18, being surrounded by the casing 15.

Thus, in the present embodiment, the turboprop is a "conventional" turboprop.

It should be noted that, in the present embodiment, this is a front-end configuration; such a configuration is, of course, provided by way of illustration of the invention, which is not limited to only this configuration. Thus, the invention is in particular applicable to turboprops having a rear-end configuration.

In the present embodiment, the gas turbine 11 comprises a free turbine, it comprises the high-pressure turbine and its turbine shaft 14, and the free turbine 111 and its secondary shaft. For more information about the drive mechanism provided by the turboprop in the present embodiment of the invention, reference is made to the description of FIG. 2.

It should be noted, of course, that while the present configuration of the turboprop 10 described above is in line with the teaching in document FR 3057029, it is not limited to only this configuration of the rotating electric machine 19 in which the rotating electric machine is arranged concentrically with the propeller shaft 13. Thus, for example, the present teaching can easily be adapted to an offset configuration as disclosed in document US 2017/321601.

It should also be noted that, while the rotating electric machine 19 is a simple rotating electric machine able to provide a generating function in this embodiment, it is also conceivable, without departing from the scope of the invention, that such a rotating electric machine 19 provides an electric propulsion function. Similarly, the rotating electric machine 19 can have additional functions, such as those of supplying a blade de-icing circuit according to the possibility disclosed in document US 2019/233128. Indeed, given the similarities between the turboprop disclosed in document FR 3057029 and the one disclosed in document US 2019/233128, a person skilled in the art is perfectly capable of applying the teaching of document US 2019/233128 to the turboprop according to the present embodiment. To this end, the parts of document US 2019/233128 related to FIG. 2 corresponding to paragraphs [14] to [20] and FIG. 2 are incorporated by reference into this document.

Figure 2:
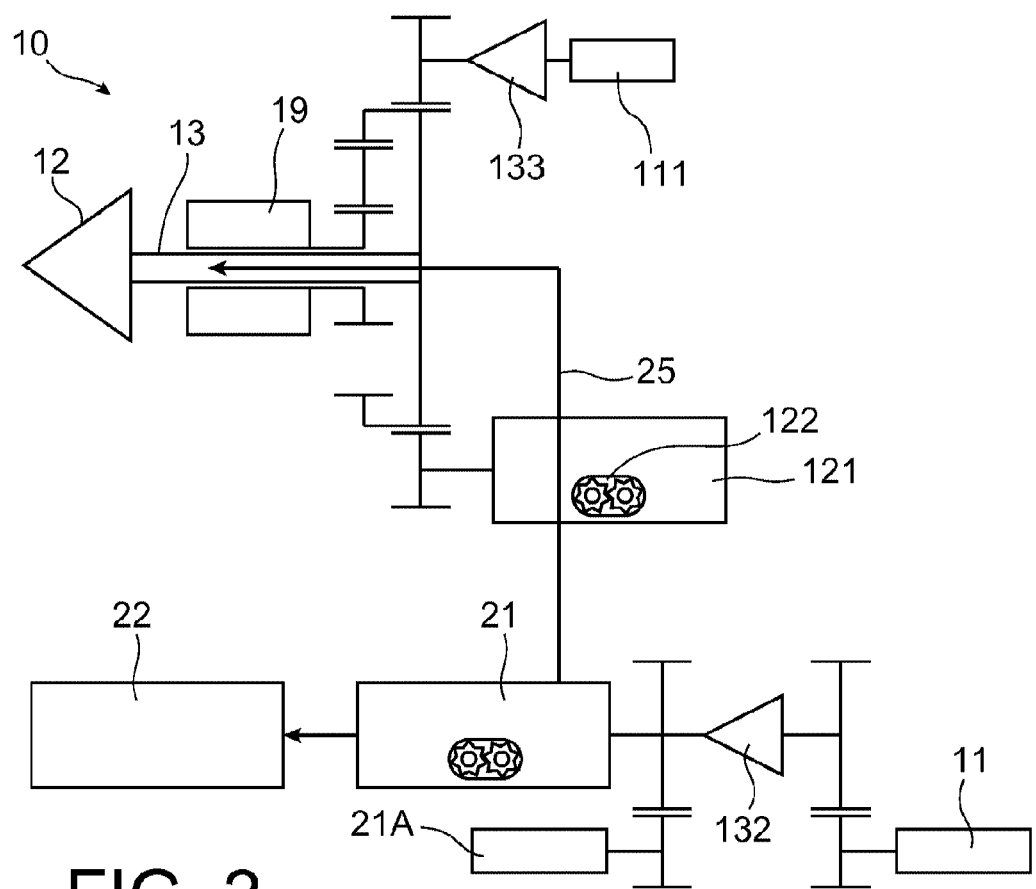
FIG. 2 shows the kinematic diagram of the various elements of the turboprop when a ram air turbine operating mode of the turboprop is initiated according to a first embodiment of the invention.

In order to supply fluid to the various bearings 22 of the turboprop 10 and a hydraulic circuit for adjusting a pitch of the propeller 12, the turboprop 10 according to this first embodiment comprises, as shown by the kinematic diagram in FIG. 2, an engine oil pump 21. This engine oil pump 21 is, according to the principle of the invention, designed to be electrically operated. To do this, the turboprop 10 also comprises an auxiliary rotating electric machine 21A mechanically coupled to the engine oil pump 21.

The auxiliary rotating electric machine 21A is preferably coupled to the engine oil pump 21 such that in normal operation the main oil pump 21 does not drive the electric machine 21A. Such a configuration can in particular be obtained by means of a freewheel (not depicted).

In this first embodiment and according to a typical configuration of a turboprop, the engine oil pump 21 is also mechanically coupled to a turbine of the turboprop 10, the gas turbine 11 in this case, i.e. the high-pressure turbine, of the turboprop. This mechanical coupling of the engine oil pump 21 is ensured by means of a first freewheel 132 such that the gas turbine drives the engine oil pump when the turboprop is in operation and the gas turbine 11 is mechanically uncoupled from the engine oil pump 21 when the latter is driven by the auxiliary rotating electric machine 21A.

It should be noted, in addition, as shown in FIG. 2, when the ram air turbine type operating mode is initiated, that a bypass system is provided which, when the engine oil pump 21 is electrically operated, is adapted to allow oil to be supplied to the hydraulic circuit 25 for adjusting a pitch of the propeller 12 via the servo valve 26 bypassing the dedicated oil pump 122 of a system for managing the propeller pitch 121. Such bypassing enables the supply of oil to the hydraulic adjustment circuit 25 to be optimized as described hereinafter with reference to FIG. 4.

Such a turboprop 10 is adapted for carrying out a method for controlling it as a ram air turbine, the method comprising the following steps:
electrically operating the engine oil pump 21 by means of the auxiliary rotating electric machine 21A so as to supply oil to the hydraulic circuit for adjusting a pitch of the propeller 12,
adjusting the pitch of the propeller to generate the windmill effect to rotationally drive the propeller, this adjustment preferably being carried out so as to maximize said windmill effect,
the rotating electric machine 19 being rotationally driven by the propeller shaft 13 due to the mechanical coupling between them, generating electricity from the rotating electric machine 19.

It should be noted that the turboprop 10 comprises a control unit for carrying out such a method, also known as FADEC (Full Authority Digital Engine Control), which is designed to carry out such a control method when the turboprop 10 is ordered to be put in ram air turbine mode.

To do this during the step of electrically operating the engine oil pump 21, the turboprop 10 can have the schematic kinetic configuration shown in FIG. 2.

Thus, as shown in FIG. 2, when the ram air turbine mode is initiated, the rotating electric machine 19 is directly coupled to the propeller shaft 13, and therefore to the propeller 12 by means of a set of gears for speed adaptation between the rotating electric machine 19 and the propeller shaft 13. Amongst this set of gears, the input gear of the propeller shaft 13 is also coupled to the free turbine 111 of the gas turbine 11, via a second freewheel 133, and to the propeller 121 control unit. It should be noted that, in order to simplify the kinematic diagram, the free turbine 111 is artificially separated from the gas turbine as the free turbine 111 is rotationally uncoupled from the turbine shaft 14. The engine oil pump 21 is mechanically coupled to the auxiliary rotating electric machine 21A such that the engine oil pump 21 is electrically operated by the auxiliary rotating electric machine 21A. The engine oil pump 21 is also mechanically coupled to the gas turbine 11, or more specifically to the high-pressure turbine and to the turbine shaft 14, by means of the first freewheel 132.

With such freewheels 132, 133, it is not necessary to use selective coupling systems when switching from the conventional propulsion mode, provided by the gas turbine 11, to the ram air turbine mode. The drive mechanism is thus simplified and is therefore easier to maintain. Thus, these freewheels 132, 133 enable the engine oil pump 21 to be uncoupled from the gas turbine 11 when it is electrically operated and enable the propeller shaft 13 to be uncoupled from the free turbine 111 when the turboprop 10 operates in ram air turbine mode. As mentioned above, in this first embodiment, the bypass system allows oil to be supplied to the hydraulic circuit 25 for adjusting the pitch of the propeller 12 via the servo valve 26, shown in FIG. 4, bypassing the dedicated oil pump 122 of the system for managing the pitch of the propeller 121 which, being driven by the propeller shaft 13, is at a standstill until the propeller 12 is rotated.

It should be noted that, according to this embodiment, in line with a typical configuration of a turboprop 10, the dedicated oil pump 122 is part of a turboprop control unit (system for managing the propeller pitch 121, as known as propeller control unit or PCU for short, or a propeller control and protection unit or PCPU for short, also referred to in the present text as "system for managing the propeller pitch 121". Similarly, the rotating electric machine 19 can also be included in a power and accessory gear box or PAGB for short. The engine oil pump 21 being driven by the rotating electric machine 21A thus enables oil to be supplied to the hydraulic circuit for adjusting the pitch of the propeller 12 via the system for managing the propeller pitch 121 and thus a modification of the pitch of the propeller 12. It should be noted that in this configuration the engine oil pump 21 also enables the bearings 22 of the turboprop 10 to be supplied. Once the propeller pitch has been adjusted to take advantage of the windmill effect rotationally driving the propeller, the ram air turbine mode is initiated and the propeller 12 starts to rotate.

Figure 3:
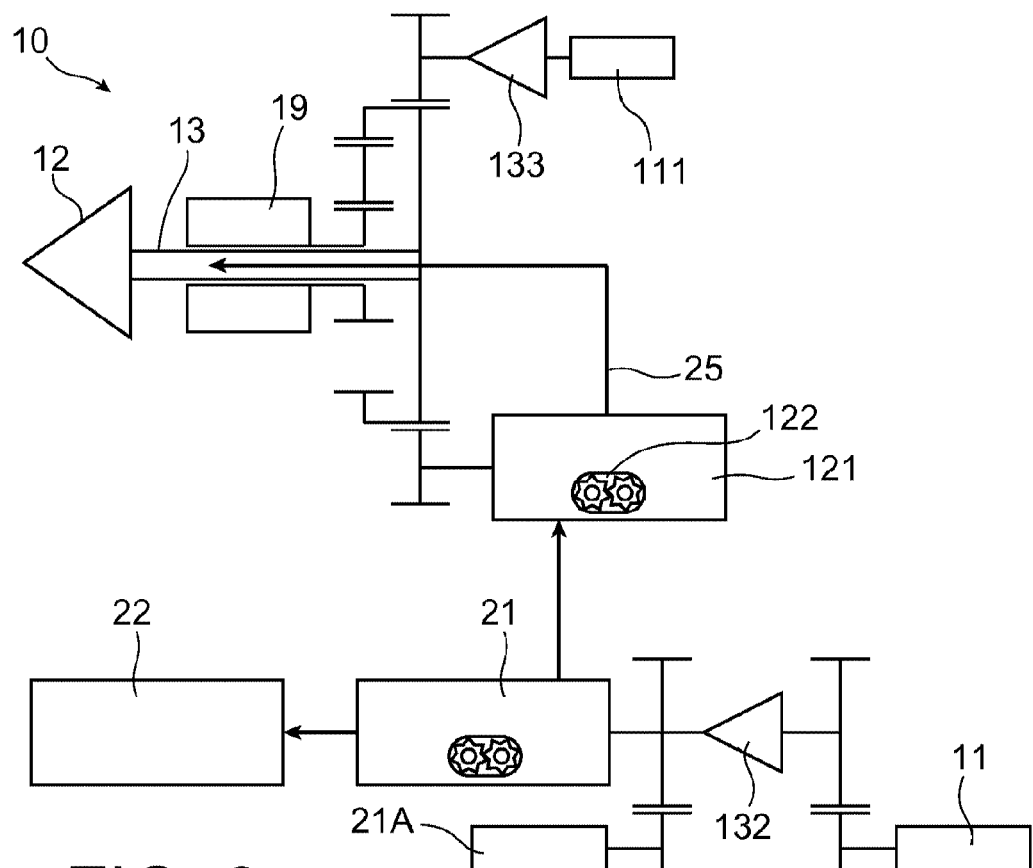
FIG. 3 shows the kinematic diagram of the various elements of the turboprop in a ram air turbine operating mode of a turboprop according to the first embodiment of the invention.

Thus, in the ram air turbine mode, the propeller having started to rotate, the kinematic diagram of the turboprop 10 changes and matches the diagram shown in FIG. 3. It can be seen that this kinematic diagram differs from that of the initiation shown in FIG. 2: the dedicated oil pump 123 of the system for managing the propeller pitch 121, being rotationally driven, no longer constitutes an obstacle to the flow of oil from the engine oil pump 21. Therefore, as described hereinafter with reference to FIG. 4, the bypass circuit is deactivated and the servo valve 26 is supplied via the dedicated oil pump 123 enabling the hydraulic adjustment circuit 25 to be supplied and, as a result, enabling the pitch of the propeller 12 to be adjusted accordingly. In the kinematic diagram, the rotating electric machine 19, being rotationally driven by the propeller 12, generates electricity to power, according to the ram air turbine principle, the equipped aircraft and thus ensure that the essential onboard systems such as the critical flight controls and flight instruments continue to function.

Figure 4:
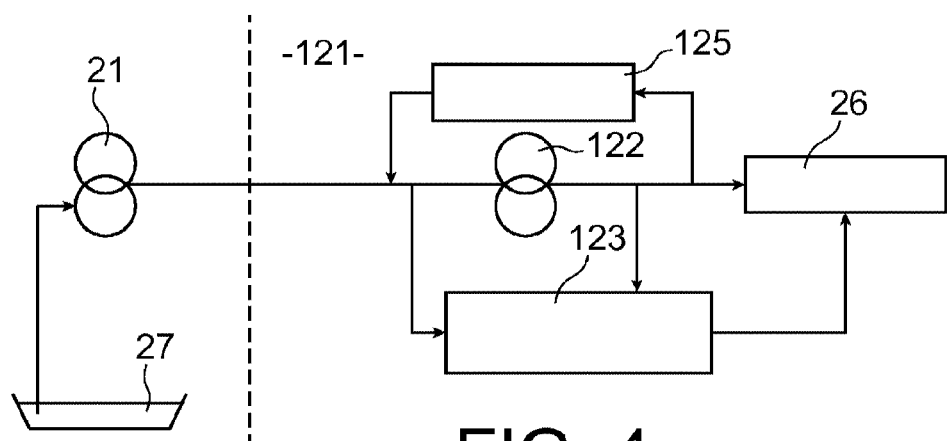
FIG. 4 schematically shows the system for managing the propeller pitch of a turboprop according to the first embodiment of the invention.

FIG. 4 shows the oil circuit of the turboprop 10 according to this first embodiment. It shows that, according to a typical configuration of a turboprop 10, the engine oil pump 21 enables the oil collected at the bottom of the accessory gear box 27 to be recovered in order to re-inject it into the oil circuit. Thus, part of this oil is fed to the servo valve 26 via the dedicated oil pump 122 of the system for managing the propeller pitch 121. The bypass system, in order to supply the servo valve 26 while the dedicated gear box oil pump 122 is at a standstill comprises a bypass valve 123 controlled as a function of the oil pressure provided by the oil pump 122 of the system for managing the propeller pitch 121. Thus, when the oil pressure provided by the dedicated oil pump 122 of the system for managing the propeller pitch 121 is lower than a certain value, i.e. the dedicated oil pump 122 of the system for managing the propeller pitch 121 is at a standstill or does not rotate much, the bypass valve 123 is opened in order to supply the servo valve 26 bypassing the dedicated oil pump 122 of the system for managing the propeller pitch 121. After the ram air turbine mode has been initiated, the dedicated oil pump 122 of the system for managing the propeller pitch 121 being rotationally driven by the propeller shaft, the oil pressure provided by the dedicated oil pump 122 of the system for managing the propeller pitch 121 increases. When the oil pressure provided by the dedicated oil pump 122 becomes greater than a certain value deemed sufficient, for example greater than or equal to 2, or 4 bar, the bypass valve 123 can be closed and thus oil is only supplied to the servo valve 26 by the dedicated oil pump 122 of the system for managing the propeller pitch 121.

Figure 9:
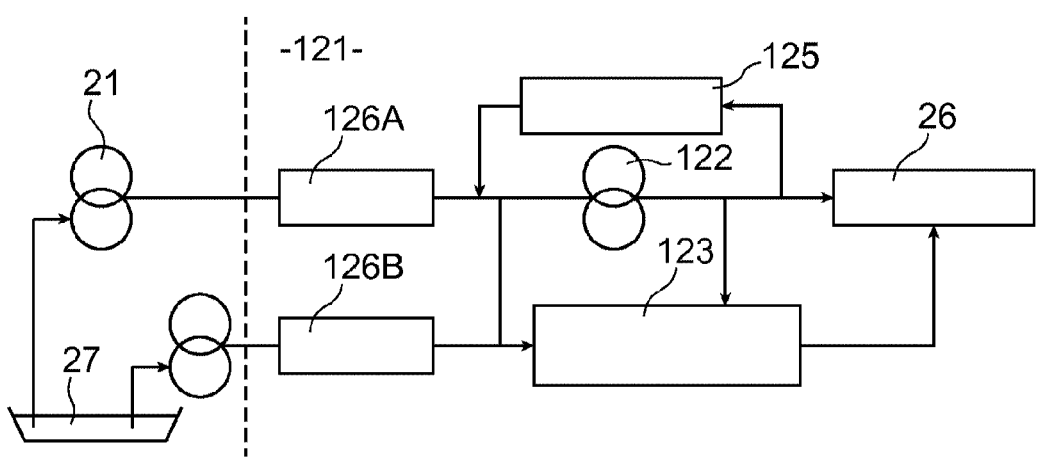
FIG. 9 schematically shows the system for managing the propeller pitch of a turboprop according to the third embodiment of the invention.

It should be noted that FIGS. 4 and 9 show a servo valve 26 controlled by a control unit of the turboprop 10 in order to adjust the hydraulic pressure transmitted to the actuator (not shown), enabling the pitch of the propeller 12 to be adjusted.

The oil circuit of the turboprop 10 can also comprise, as shown in FIG. 4, a relief valve 125 adapted to recirculate the flow of oil generated by the dedicated oil pump 122 of the system for managing the propeller pitch 121 which is too much relative to the consumption of oil required by the propeller 12. Such a relief valve 125 can thus, for example, be adjusted to limit the pressure applied to the hydraulic circuit for adjusting the pitch of the propeller to a value of less than 50 bar, or 35 bar, or even 25 bar.

Such a turboprop 10 can provide a ram air turbine function when it is fitted to an aircraft. When an aircraft is fitted with a plurality of turboprops 10 according to the invention, it can be configured to carry out a control method comprising, when the aircraft is in flight, the following steps:
  all of the turboprops 10 from the plurality of turboprops having stopped, receiving a request to put at least one turbomachine in a ram air turbine type operating mode,
  one of the turboprops 10 from the plurality of turboprops carrying out a method for controlling it as a ram air turbine, as described above, this turboprop 10 preferably being the turboprop 10 among the plurality of turboprops which is the last to stop.

It should be noted that in the event that, when the control method is carried out by the last turboprop to stop, it proves incapable of switching to ram air turbine mode, it is possible to identify among the other turboprops from the plurality of turboprops 10 the one with the highest oil temperature. Once said turboprop 10 with the highest oil temperature has been identified, it can be configured to carry out the control method according to the invention to be put in ram air turbine mode.

Whether it is for identifying the last turboprop 10 to stop, or identifying the turboprop 10 among the other turboprops 10 with the highest oil temperature, each turboprop 10 can have its control unit configured to communicate with the control units of the other turboprops of the aircraft. According to this possibility, the control units can communicate status information to each other, such as an operating status, in order to know which is the last turboprop to stop, and an oil temperature, in order to identify the turboprop 10 among the other turboprops 10 with the highest oil temperature.

It should be noted that, as one alternative, it can be a control unit of the aircraft or a pilot of the aircraft who determines which turboprop 10 to switch to ram air turbine mode and who controls said turboprop 10 to carry out the aforementioned control method.

Figure 5:
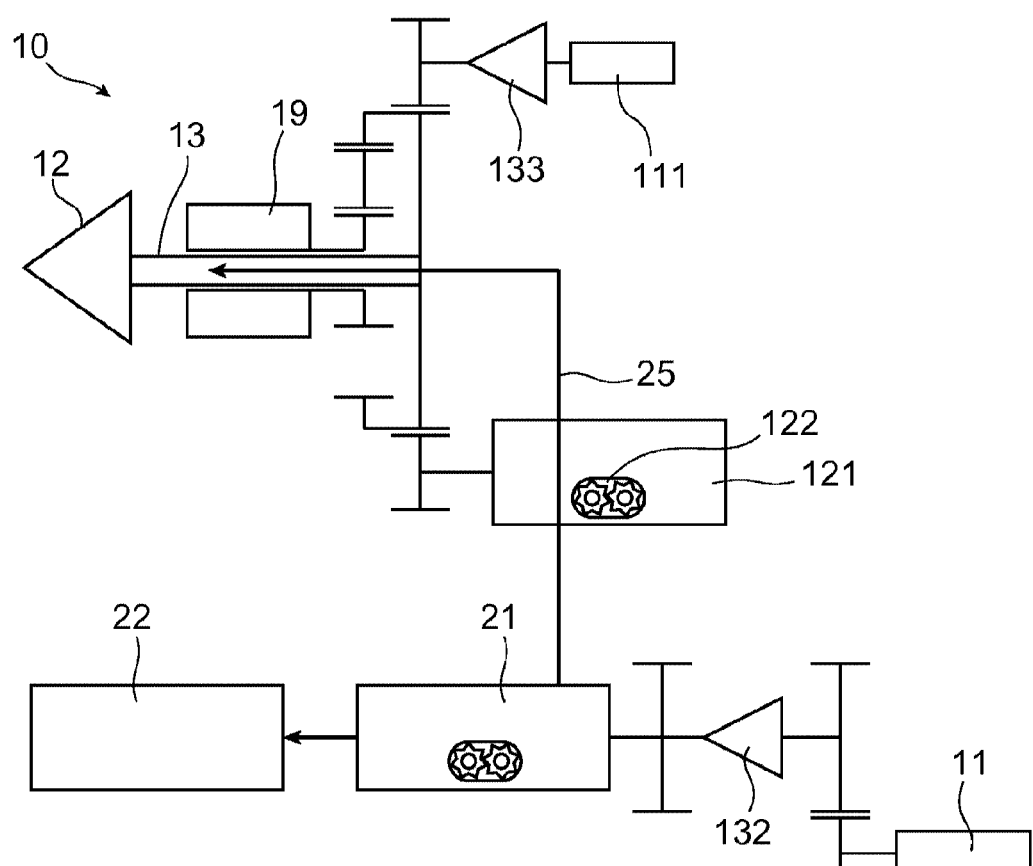
FIG. 5 shows the kinematic diagram of the various elements of the turboprop when the ram air turbine operating mode of the turboprop is initiated according to a second embodiment of the invention in which the turboprop comprises a hybrid engine oil pump.
Figure 6:
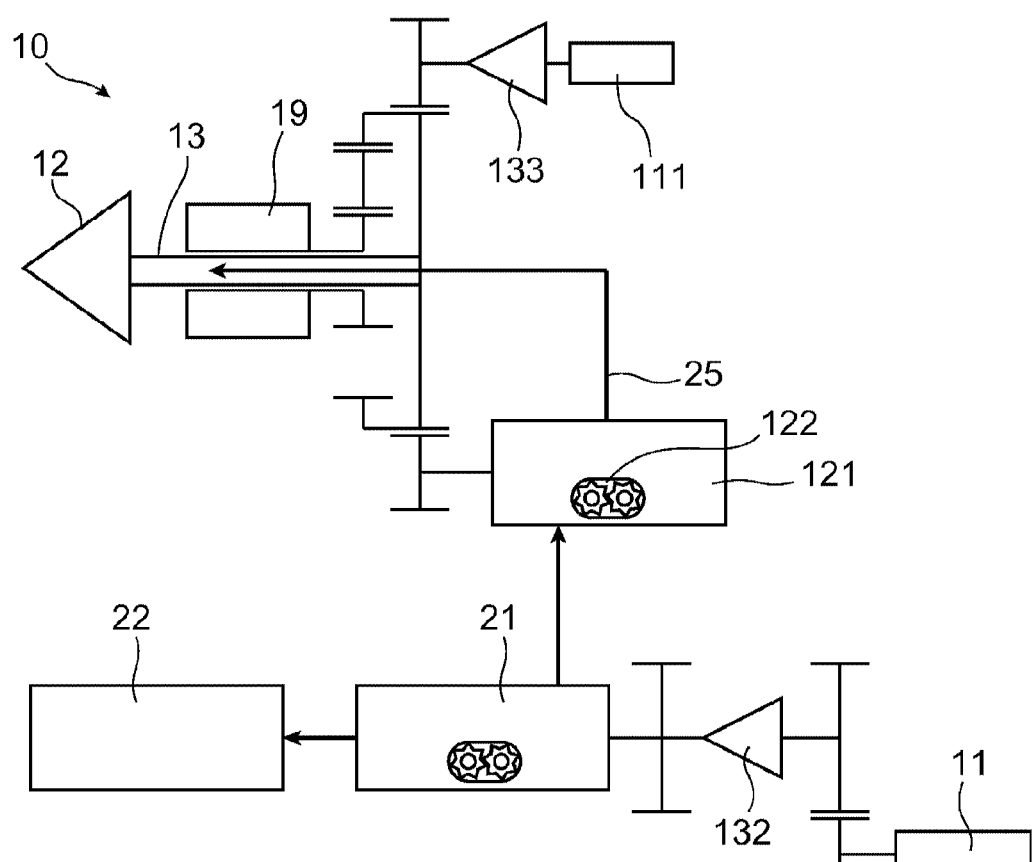
FIG. 6 shows the kinematic diagram of the various elements of the turboprop in a ram air turbine operating mode of a turboprop according to the second embodiment of the invention.

FIGS. 5 and 6 show kinematic diagrams of the initiation of the ram air turbine mode and of the ram air turbine mode in the second embodiment of the invention in which the engine oil pump 21 is a hybrid pump designed to be both operated electrically and driven by the gas turbine.

Thus, a turbomachine 10 according to this second embodiment differs from a turboprop 10 according to the first embodiment in that the engine oil pump is a hybrid pump and in that no auxiliary rotating electric machine 21A is provided.

In this way, in line with the first embodiment and as shown in FIG. 5, when the ram air turbine mode of the turboprop is initiated, the engine oil pump 21 is electrically operated by an internal electric motor and makes it possible to supply both the bearings 22 of the turboprop 10 and the hydraulic adjustment circuit 25. The bypass system, according to a configuration similar to the one shown in FIG. 4, makes it possible to supply the hydraulic adjustment circuit 25 bypassing the dedicated oil pump 122 of the system for managing the propeller pitch 121. As shown in FIG. 6, once the ram air turbine mode has been initiated and the propeller rotated, the dedicated oil pump 122 of the system for managing the propeller pitch 121 being driven by the propeller shaft 13, the bypass system becomes inoperative and the servo valve 26 is supplied by the engine oil pump 21 via the dedicated oil pump 122 of the system for managing the propeller pitch 121 as described in the first embodiment.

A turboprop 10 according to this second embodiment can be put in ram air turbine mode according to a control method that is identical to the one in the first embodiment.

Figure 7:
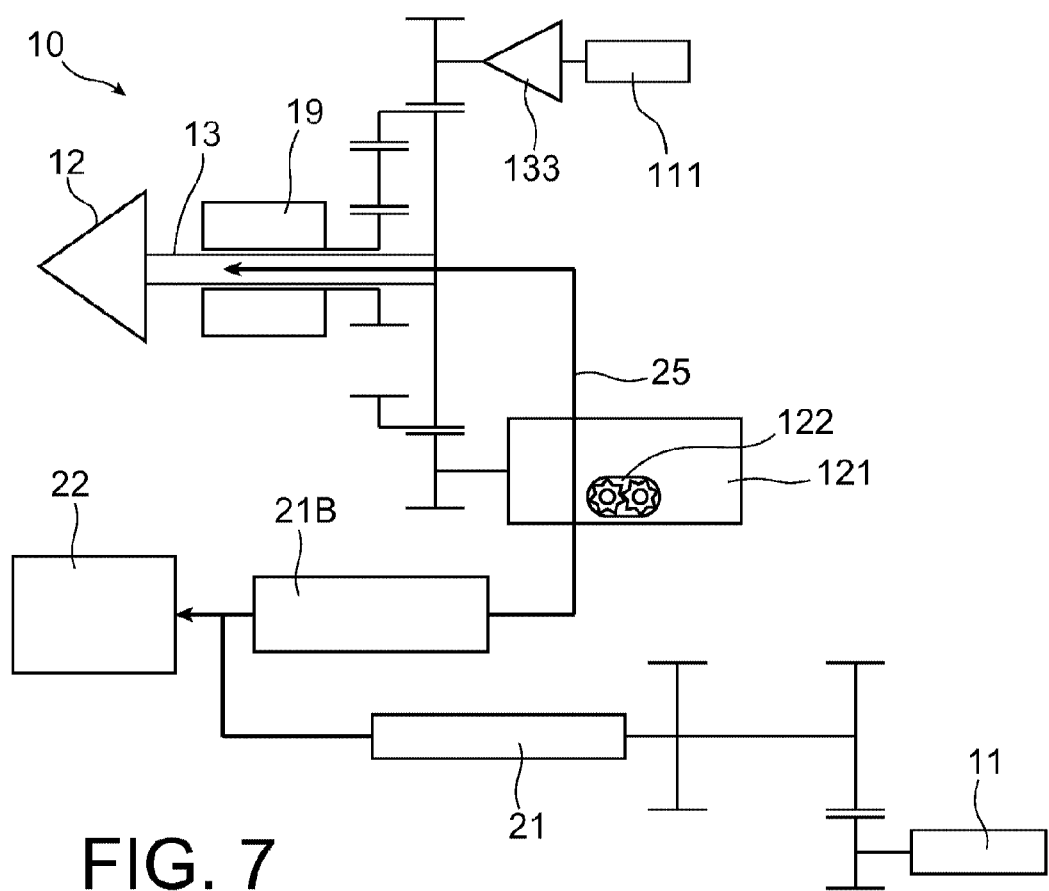
FIG. 7 shows the kinematic diagram of the various elements of the turboprop when the ram air turbine operating mode of the turboprop is initiated according to a third embodiment of the invention in which the turboprop comprises an auxiliary oil pump dedicated to the ram air turbine operating mode.
Figure 8:
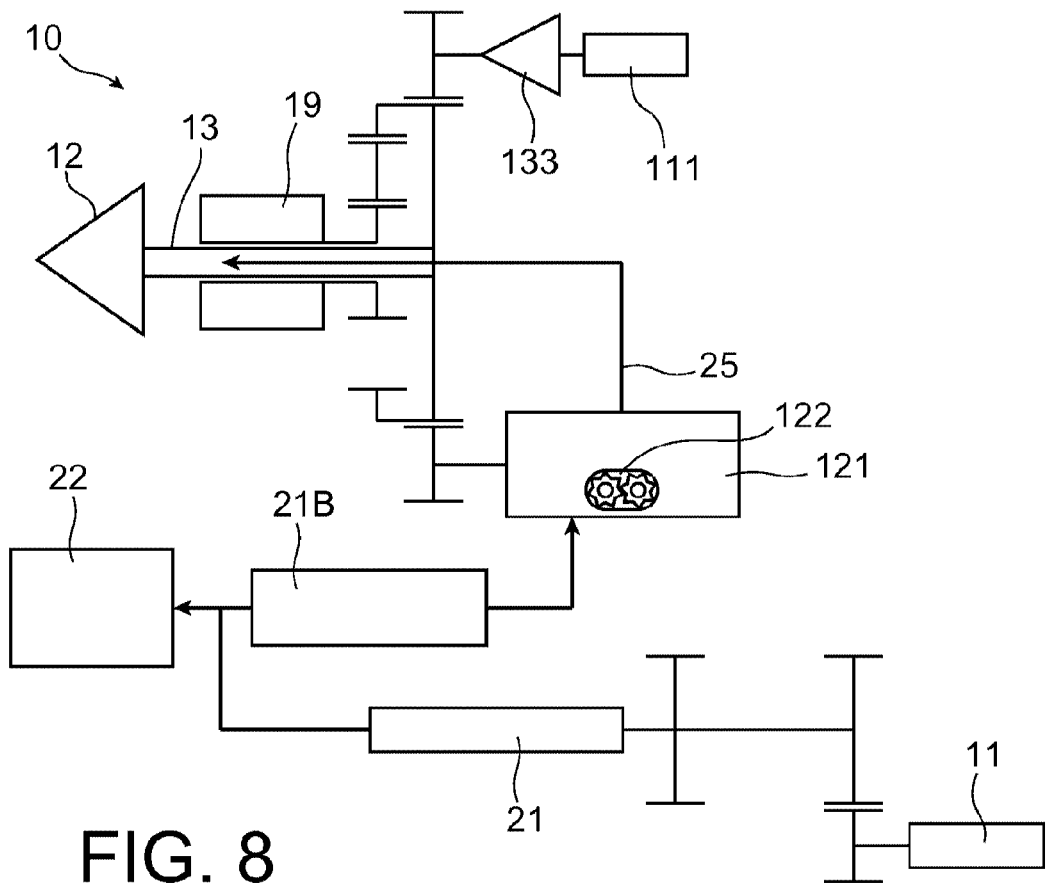
FIG. 8 shows the kinematic diagram of the various elements of the turboprop in a ram air turbine operating mode of a turboprop according to the third embodiment of the invention.

FIGS. 7 and 8 show kinematic diagrams of the initiation of the ram air turbine mode and of the ram air turbine mode in a third embodiment of the invention in which an auxiliary electric oil pump 21B is provided, which is adapted to be electrically operated and to supply oil to the servo valve 26 and the bearings 22 of the turboprop 10.

A turboprop 10 according to this third embodiment differs from a turboprop 10 according to the first embodiment in that it comprises the auxiliary electric oil pump 21B in parallel with the engine oil pump 21 and in that no auxiliary rotating electric machine 21A is provided.

In this way, in line with the first embodiment and as shown in FIG. 7, when the ram air turbine mode of the turboprop 10 is initiated, while the engine oil pump 21 is at a standstill, the auxiliary electric oil pump 21B is electrically operated and makes it possible to supply both the bearings 22 of the turboprop 10 and the servo valve 26 of the system for managing the propeller pitch 121 then the hydraulic adjustment circuit 25. A bypass system, according to a configuration described hereinafter with reference to FIG. 9, makes it possible here again to supply the hydraulic adjustment circuit 25 via the servo valve 26 bypassing the oil pump 122 of the system for managing the propeller pitch 121.

In the same way as for the first and second embodiment and as shown in FIG. 8, once the ram air turbine mode has been initiated and the propeller rotated, the dedicated oil pump 122 of the system for managing the propeller pitch 121 being driven by the propeller shaft 13, the bypass system becomes inoperative and the hydraulic adjustment circuit 25 is supplied by the auxiliary electric oil pump 21B via the dedicated oil pump 122 and the servo valve 26 of the system for managing the propeller pitch 121 as described in the first embodiment.

FIG. 9 shows the oil circuit of the turboprop 10 according to this third embodiment. Such an oil circuit differs from an oil circuit according to the first embodiment in that two parallel oil supply circuits are provided, one supplied by the engine oil pump 21 and the other by the auxiliary electric oil pump 21B in order to supply both the servo valve 26 of the system for managing the propeller pitch 121 and the bearings 22 of the turboprop 10. Thus, as shown in FIG. 9, both the engine oil pump 21 and the auxiliary electric oil pump 21B enable the oil collected at the bottom of the accessory gear box 27 to be recovered in order to re-inject it into the oil circuit.

In order to prevent a loss of pressure in the inactive pump, among the engine oil pump 21 and the auxiliary electric oil pump 21B, a non-return valve system 126A, 126B is provided on each of the supply circuits supplied by the engine oil pump 21 and the auxiliary electric oil pump 21B.

The invention claimed is:

1. A turboprop comprising:
 a propeller,
 a propeller shaft carrying the propeller, the propeller being a variable-pitch propeller having a propeller pitch,
 a rotating electric machine having at least a first configuration in which it is mechanically coupled to the propeller shaft, and
 at least one oil pump configured to supply a hydraulic circuit for adjusting the propeller pitch, the at least one oil pump is configured to be electrically operated,
 wherein the at least one oil pump is configured to supply fluid to bearings of the turboprop.

2. The turboprop according to claim 1, wherein the at least one oil pump is an engine oil pump designed to also be driven by a turbine of the turboprop, the engine oil pump being mechanically coupled to said turbine with a freewheel.

3. The turboprop according to claim 2, wherein the at least one oil pump is a hybrid engine oil pump designed to be driven either by the turbine, or by an electric engine inside the engine oil pump.

4. The turboprop according to claim 1, wherein the at least one oil pump is an auxiliary electric pump supplying the hydraulic circuit for adjusting the propeller pitch in parallel with an engine oil pump of the turboprop rotationally driven by a turbine of the turboprop.

5. The turboprop according to claim 1, also comprising a system for managing the propeller pitch including a dedicated oil pump and a servo valve, the dedicated oil pump and the servo valve being supplied with oil by the at least one oil pump, the system for managing the propeller pitch being arranged between the at least one oil pump and the hydraulic circuit for adjusting the propeller pitch,
 wherein the turboprop also comprises a bypass system which, when the at least one oil pump is electrically operated, is adapted to allow oil to be supplied to the hydraulic circuit for adjusting the propeller pitch via the servo valve bypassing the dedicated oil pump of the system for managing the propeller pitch.

6. An aircraft comprising at least one turboprop according to claim 1.

7. A method for controlling a turboprop as a ram air turbine, wherein the turboprop is a turboprop according to claim 1, the method comprising:
 electrically operating the at least one oil pump so as to supply oil to the hydraulic circuit for adjusting the propeller pitch, and to bearings of the turboprop,
 adjusting the propeller pitch to generate a windmill effect to rotationally drive the propeller, and
 generating electricity from the rotating electric machine by rotationally driving the rotating electric machine by the propeller shaft due to mechanical coupling between the rotating electric machine and the propeller shaft.

8. A method for controlling an aircraft comprising a plurality of turboprops according to claim 1, comprising, when the aircraft is in flight:
 stopping the plurality of turboprops,
 receiving a request to put at least one turboprop in a ram air turbine operating mode, and
 carrying out a control method for one turboprop from the plurality of turboprops to be in the ram air turbine operating mode.

9. The control method according to claim 8, wherein the one turboprop in the ram air turbine operating mode is last to stop.

10. The control method according to claim 8, further comprising:
 identifying a turboprop from the plurality of turboprops with a highest oil temperature, carrying out a control method for the identified turboprop to be in the ram air turbine operating mode.

* * * * *